United States Patent
Kim et al.

(10) Patent No.: US 11,256,965 B2
(45) Date of Patent: Feb. 22, 2022

(54) APPARATUS AND METHOD FOR RECOGNIZING OBJECT USING IMAGE

(71) Applicants: Hyundai Motor Company, Seoul (KR); Kia Motors Corporation, Seoul (KR); Korea Advanced Institute of Science and Technology, Daejeon (KR)

(72) Inventors: Young Hyun Kim, Gyeonggi-do (KR); Yang Shin Kim, Incheon (KR); Min Woo Park, Gyeonggi-do (KR); Jun Mo Kim, Daejeon (KR); Si Haeng Lee, Daejeon (KR); Jang Hyeon Lee, Daejeon (KR); Do Yeon Kim, Daejeon (KR); Hae Chang Jung, Daejeon (KR)

(73) Assignees: Hyundai Motor Company, Seoul (KR); Kia Motors Corporation, Seoul (KR); Korea Advanced Institute of Science and Technology, Daejeon (KR)

(*) Notice: Subject to any disclaimer, the term of this patent is extended or adjusted under 35 U.S.C. 154(b) by 213 days.

(21) Appl. No.: 16/601,217

(22) Filed: Oct. 14, 2019

(65) Prior Publication Data

US 2020/0394476 A1     Dec. 17, 2020

(30) Foreign Application Priority Data

Jun. 17, 2019    (KR) ................ 10-2019-0071690

(51) Int. Cl.
*G06K 9/62*      (2006.01)
*G06T 7/50*      (2017.01)
*G06N 3/04*      (2006.01)
*G06K 9/54*      (2006.01)

(52) U.S. Cl.
CPC ............. *G06K 9/6289* (2013.01); *G06K 9/54* (2013.01); *G06K 9/629* (2013.01); *G06N 3/04* (2013.01); *G06T 7/50* (2017.01); *G06T 2207/10024* (2013.01); *G06T 2207/20084* (2013.01)

(58) Field of Classification Search
CPC ........ G06K 9/6289; G06K 9/629; G06K 9/54; G06K 9/00791; G06K 9/00208; G06K 9/4652; G06K 9/4628; G06T 7/50; G06T 2207/10024; G06T 2207/20084; G06N 3/04; G06N 3/0454
See application file for complete search history.

(56) References Cited

U.S. PATENT DOCUMENTS

2018/0181802 A1*   6/2018   Chen .................... G06N 3/0454
2019/0378287 A1*   12/2019   Hollander ................. G06T 7/55
2020/0005482 A1*   1/2020   Hollander .......... G06K 9/00744

(Continued)

OTHER PUBLICATIONS

Yinzhang Ding (Monocular image depth estimation using dilated convolution and spatial pyramid polling structure) (Year: 2019).*
Yu, et al. "Dilated Residual Networks." CVPR. vol. 2. 2017.

*Primary Examiner* — Solomon G Bezuayehu
(74) *Attorney, Agent, or Firm* — Mintz Levin Cohn Ferris Glovsky and Popeo, P.C.; Peter F. Corless

(57) ABSTRACT

An apparatus for recognizing an object using an image includes a depth map generator that generates a depth map using a feature map of the image based on a dilated convolutional neural network (DCNN) and an object recognition device that recognizes the object using the depth map generated by the depth map generator and the image.

16 Claims, 14 Drawing Sheets

(56) References Cited

U.S. PATENT DOCUMENTS

| | | | |
|---|---|---|---|
| 2020/0082155 A1* | 3/2020 | Kalscheur | G06K 9/2027 |
| 2020/0082160 A1* | 3/2020 | Li | G06K 9/6289 |
| 2020/0160546 A1* | 5/2020 | Gu | G06N 3/08 |
| 2020/0241574 A1* | 7/2020 | Lin | G05D 1/12 |
| 2020/0294201 A1* | 9/2020 | Planche | G06K 9/40 |
| 2020/0372709 A1* | 11/2020 | Ponjou Tasse | H04N 5/06 |
| 2020/0402251 A1* | 12/2020 | Ban | G06K 9/6217 |
| 2021/0046862 A1* | 2/2021 | Wang | G06K 9/2027 |
| 2021/0156697 A1* | 5/2021 | Wu | G06T 7/50 |
| 2021/0182577 A1* | 6/2021 | Takami | G06K 9/6256 |

* cited by examiner

APPARATUS AND METHOD FOR RECOGNIZING OBJECT USING IMAGE

CROSS-REFERENCE TO RELATED APPLICATION

This application claims under 35 U.S.C. § 119(a) the benefit of Korean Patent Application No. 10-2019-0071690, filed in the Korean Intellectual Property Office on Jun. 17, 2019, the entire contents of which are incorporated herein by reference.

BACKGROUND

(a) Technical Field

The present disclosure relates to an apparatus and method for recognizing an object using a depth map estimated from a single image.

(b) Description of the Related Art

In general, deep learning or a deep neural network is one type of machine learning. An artificial neural network (ANN) of several layers may be provided between an input and an output. Such an ANN may include a convolutional neural network (CNN), a recurrent neural network (RNN), or the like depending on its structure, problems to be solved, purposes, and the like.

The deep learning is used to address various problems, for example, classification, regression, localization, detection, and segmentation. Particularly, in an autonomous system, semantic segmentation and object detection, capable of determining a location and type of a dynamic or static obstruction, may be used.

Semantic segmentation refers to performing classification prediction on a pixel-by-pixel basis to find an object in an image and segmenting the object for each pixel. By use of semantic segmentation, it may be verified whether a certain object exists in the image and locations of pixels, each of which has the same meaning (the same object), may be accurately ascertained.

The object detection refers to classifying and predicting a type of an object in an image and performing regression prediction of a bounding box to fine location information of the object. By use of object detection, a type of the object in the image and location information of the object may be determined.

A light detection and ranging (LiDAR) sensor is one type of an environment sensor used for measuring location coordinates of a reflector, and the like in a data type, such as a point cloud, based on a time when a laser beam is reflected and returned after it omnidirectionally shoots the laser beam while rotating.

An existing technology of recognizing an object based on a high-resolution reflection map obtained using such a LiDAR sensor additionally should have a high-priced LiDAR sensor in the vehicle.

Another existing technology of generating a depth map based on information about a disparity between two images obtained using a stereo camera and recognizing an object using the generated depth map needs a sophisticated calibration task based on an internal parameter and an external parameter of the stereo camera when the stereo camera is installed and needs a high amount of calculation to calculate information about a disparity between images, each of which has high resolution, input from the stereo camera.

SUMMARY

An aspect of the present disclosure provides an apparatus and method for recognizing an object to generate a depth map using a single image based on a dilated convolutional neural network (DCNN) and recognize the object based on the generated depth map and the single image so as to recognize the object without a light detection and ranging (LiDAR) sensor and increase an object recognition rate as compared with existing object recognition technology.

According to an aspect of the present disclosure, an apparatus may include: a depth map generator that generates a depth map using a feature map of an image based on a dilated convolutional neural network (DCNN) and an object recognition device that recognizes an object using the depth map generated by the depth map generator and the image.

The apparatus may further include an input device that inputs a feature map of a red-green-blue (RGB) image to the depth map generator and inputs the RGB image to the object recognition device.

The input device may include a first convolution module that generates a 16-channel feature map using the RGB image, a second convolution module that generates a 16-channel feature map using a gray image of the RGB image, and a concatenation module that generates a 32-channel feature map by concatenating the 16-channel feature map generated by the first convolution module and the 16-channel feature map generated by the second convolution module. Each of the first convolution module and the second convolution module may use a 3×3 filter.

The input device may include a first convolution module that generates a 16-channel feature map using the RGB image, a second convolution module that generates an 8-channel feature map using a gray image of the RGB image, a third convolution module that generates an 8-channel feature map using a light detection and ranging (LiDAR) image, and a concatenation module that generates a 32-channel feature map by concatenating the 16-channel feature map generated by the first convolution module, the 8-channel feature map generated by the second convolution module, and the 8-channel feature map generated by the third convolution module. Each of the first convolution module, the second convolution module, and the third convolution module may use a 3×3 filter.

The depth map generator may generate the depth map in a manner to gradually reduce resolution of the feature map and return the reduced resolution of the feature map.

The depth map generator may apply a dilation rate corresponding to the resolution of the feature map.

The depth map generator may reduce the resolution of the feature map by half.

The depth map generator may include a plurality of concatenation modules, each of which concatenates feature maps of the same channel in the process of gradually reducing the resolution of the feature map and returning the reduced resolution of the feature map.

According to another aspect of the present disclosure, a method may include: generating, by a depth map generator, a depth map using a feature map of an image based on a dilated convolutional neural network (DCNN) and recognizing, by an object recognition device, an object using the generated depth map and the image.

The method may further include inputting, by an input device, a feature map of a red-green-blue (RGB) image to the depth map generator and inputting, by the input device, the RGB image to the object recognition device.

The inputting may include generating, by a first convolution module, a 16-channel feature map using the RGB image, generating, by a second convolution module, a 16-channel feature map using a gray image of the RGB image, and generating, by a concatenation module, a 32-channel feature map by concatenating the 16-channel feature map generated by the first convolution module and the 16-channel feature map generated by the second convolution module. Each of the first convolution module and the second convolution module may use a 3×3 filter.

The inputting may include generating, by a first convolution module, a 16-channel feature map using the RGB image, generating, by a second convolution module, an 8-channel feature map using a gray image of the RGB image, generating, by a third convolution module, an 8-channel feature map using a light detection and ranging (LiDAR) image, and generating, by a concatenation module, a 32-channel feature map by concatenating the 16-channel feature map generated by the first convolution module, the 8-channel feature map generated by the second convolution module, and the 8-channel feature map generated by the third convolution module. Each of the first convolution module, the second convolution module, and the third convolution module may use a 3×3 filter.

The generating of the depth map may include generating the depth map in a manner to gradually reduce resolution of the feature map and return the reduced resolution of the feature map.

The generating of the depth map may include applying a dilation rate corresponding to the resolution of the feature map.

The generating of the depth map may include reducing the resolution of the feature map by half.

The generating of the depth map may include concatenating feature maps of the same channel in the process of gradually reducing the resolution of the feature map and returning the reduced resolution of the feature map.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
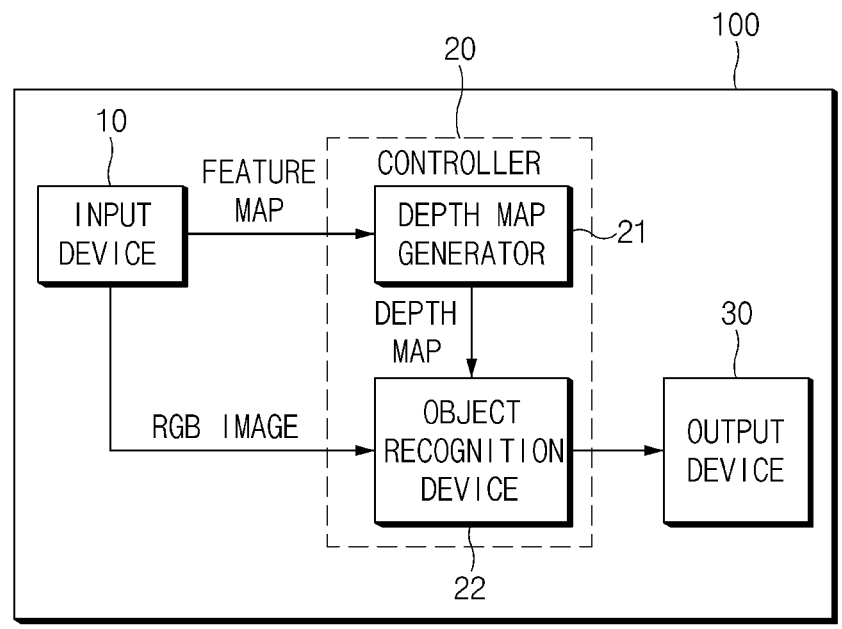
FIG. 1 is a block diagram illustrating a configuration of an apparatus for recognizing an object using an image according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

A single image in an embodiment of the present disclosure may be an image obtained by use of a general camera rather than a stereo image (a right image and a left image) obtained by use of a stereo camera and may refer to an image which does not include depth information.

Figure 2:
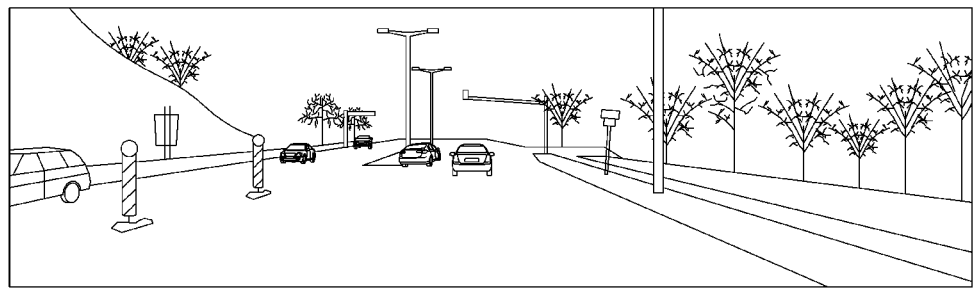
FIG. 2 is a drawing illustrating a red-green-blue (RGB) image input by an input device of an apparatus for recognizing an object using an image according to an embodiment of the present disclosure.
Figure 3:
FIG. 3 is a drawing illustrating a depth image generated by an apparatus for recognizing an object using an image according to an embodiment of the present disclosure.
Figure 4:
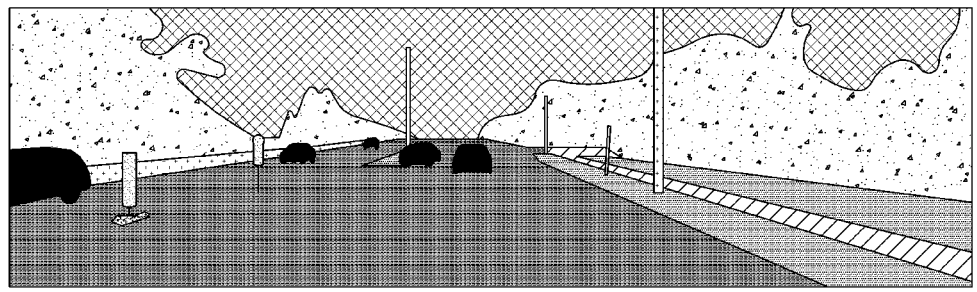
FIG. 4 is a drawing illustrating the result of recognizing an object at an apparatus for recognizing an object using an image according to an embodiment of the present disclosure.
Figure 5:
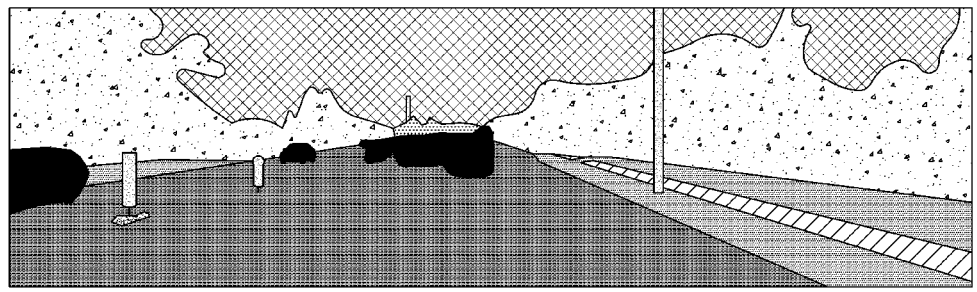
FIG. 5 is a drawing illustrating the result of recognizing an object at a conventional object recognition apparatus according to an embodiment of the present disclosure.
Figure 6:
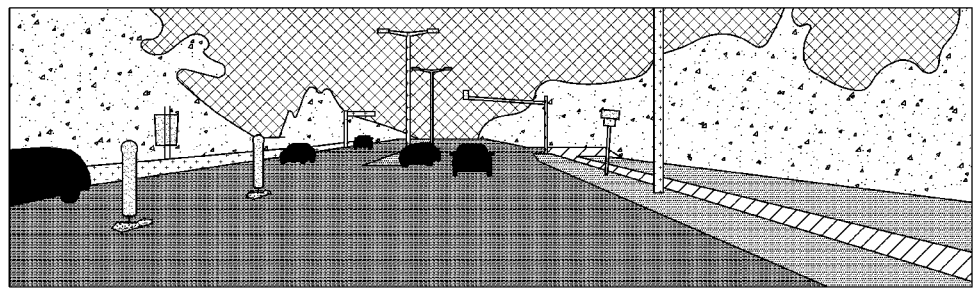
FIG. 6 is a drawing illustrating a reference recognition result.

FIG. 1 is a block diagram illustrating a configuration of an apparatus for recognizing an object using an image according to an embodiment of the present disclosure. FIG. 2 is a drawing illustrating an RGB image input by an input device of an apparatus for recognizing an object using an image according to an embodiment of the present disclosure. FIG. 3 is a drawing illustrating a depth image generated by an apparatus for recognizing an object using an image according to an embodiment of the present disclosure. FIG. 4 is a drawing illustrating the result of recognizing an object at an apparatus for recognizing an object using an image according to an embodiment of the present disclosure. FIG. 5 is a drawing illustrating the result of recognizing an object at a conventional object recognition apparatus according to an embodiment of the present disclosure. FIG. 6 is a drawing illustrating a reference recognition result.

As shown in FIG. 1, an apparatus 100 for recognizing an object using an image according to an embodiment of the present disclosure may include an input device 10, a controller 20 including a depth map generator 21 and an object recognition device 22, and an output device 30. In this case, the respective components may be combined with each other to form one component and some components may be omitted, depending on how the apparatus 100 recognizes the object using the image according to an embodiment of the present disclosure.

The input device 10 may input a feature map of a camera image to the depth map generator 21 and may input a camera image (a red-green-blue (RGB) image) to the object recognition device 22. An exemplary camera image is depicted in FIG. 2.

The depth map generator 21 may generate a depth map using the feature map of the camera image based on a dilated convolutional neural network (DCNN).

The depth map generator 21 may generate the depth map in a manner to gradually reduce resolution of the feature map and return the reduced resolution of the feature map. An exemplary depth map is depicted in FIG. 3.

The object recognition device 22 may recognize an object using the depth map generated by the depth map generator 21 and the RGB image input from the input device 10. In this case, it is acceptable for the object recognition device 22 to recognize the object in any known manner. For example, an exemplary result recognized by the object recognition device 22 is depicted in FIG. 4.

For reference, an exemplary result recognized by a conventional object recognition device is shown in FIG. 5. The recognized result according to an embodiment of the present disclosure is an intersection over union (IOU) of 86.06%, whereas the conventional recognized result is only an IOU of 85.3%. In this case, the IOU is a criterion of evaluating object recognition performance. The recognized result according to an embodiment of the present disclosure is 86.06% in the degree of conformity of pixels with a reference recognition result (a semantic segmentation label) shown in FIG. 6, whereas the conventional recognized result is only 85.3%.

The output device 30 may output the result recognized by the object recognition device 22.

The controller 20 may perform overall control such that the respective components normally perform their respective functions. Such a controller 20 may be implemented in the form of hardware or software or in the form of a combination thereof. Preferably, the controller 20 may be implemented as, for example, a microprocessor.

Such a controller 20 may further include a storage (memory) as the generally well-known technology. The storage may store various logic, algorithms, and programs which are required in the process of generating the depth map using the feature map of the camera image based on the DCNN and recognizing the object using the generated depth map and the RGB image input from the input unit 10.

The storage may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

Figure 7A:
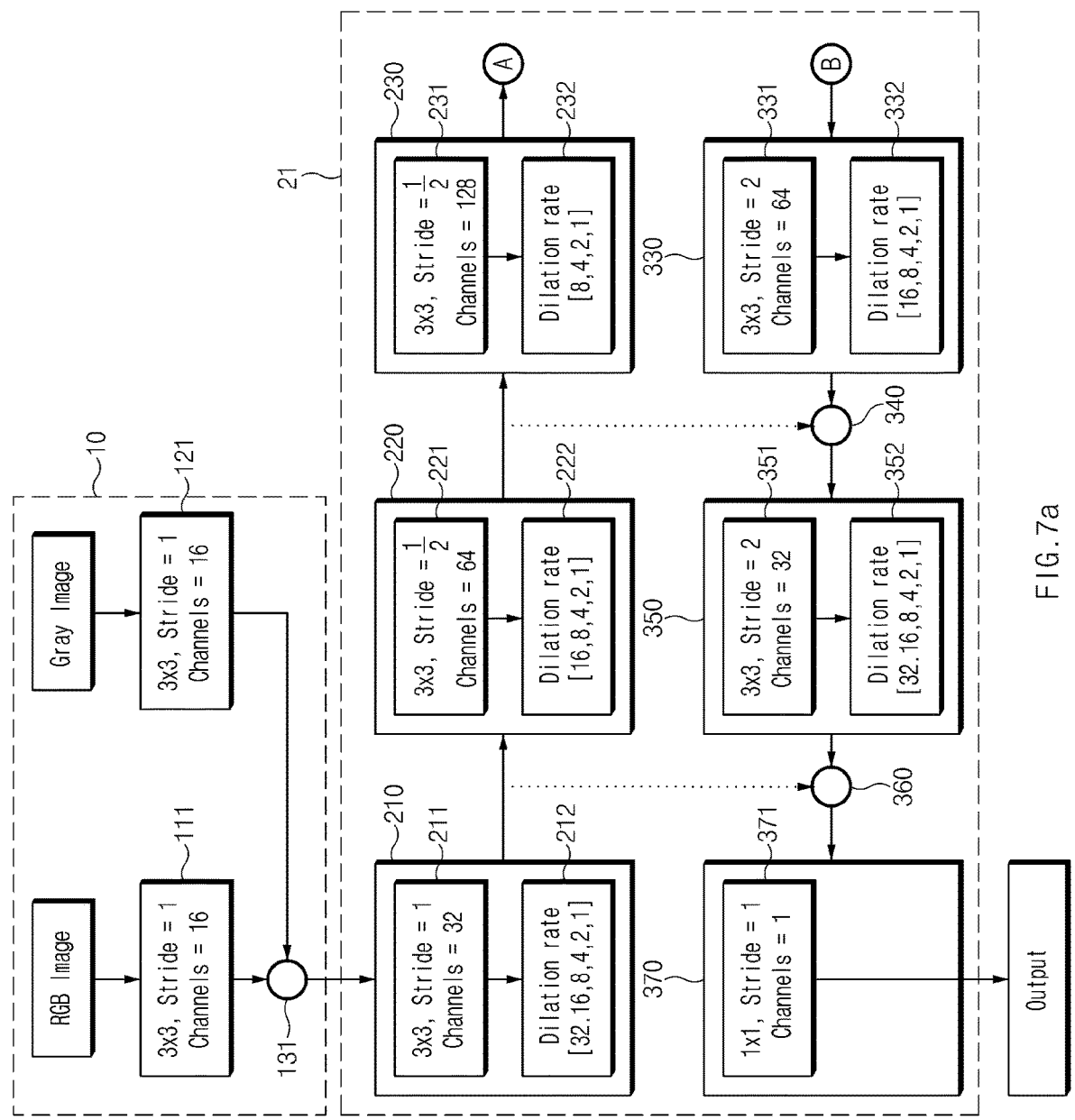
FIGS. 7A and 7B are a block diagram illustrating a detailed configuration of an apparatus for recognizing an object using an image using an image according to an embodiment of the present disclosure.
Figure 7B:
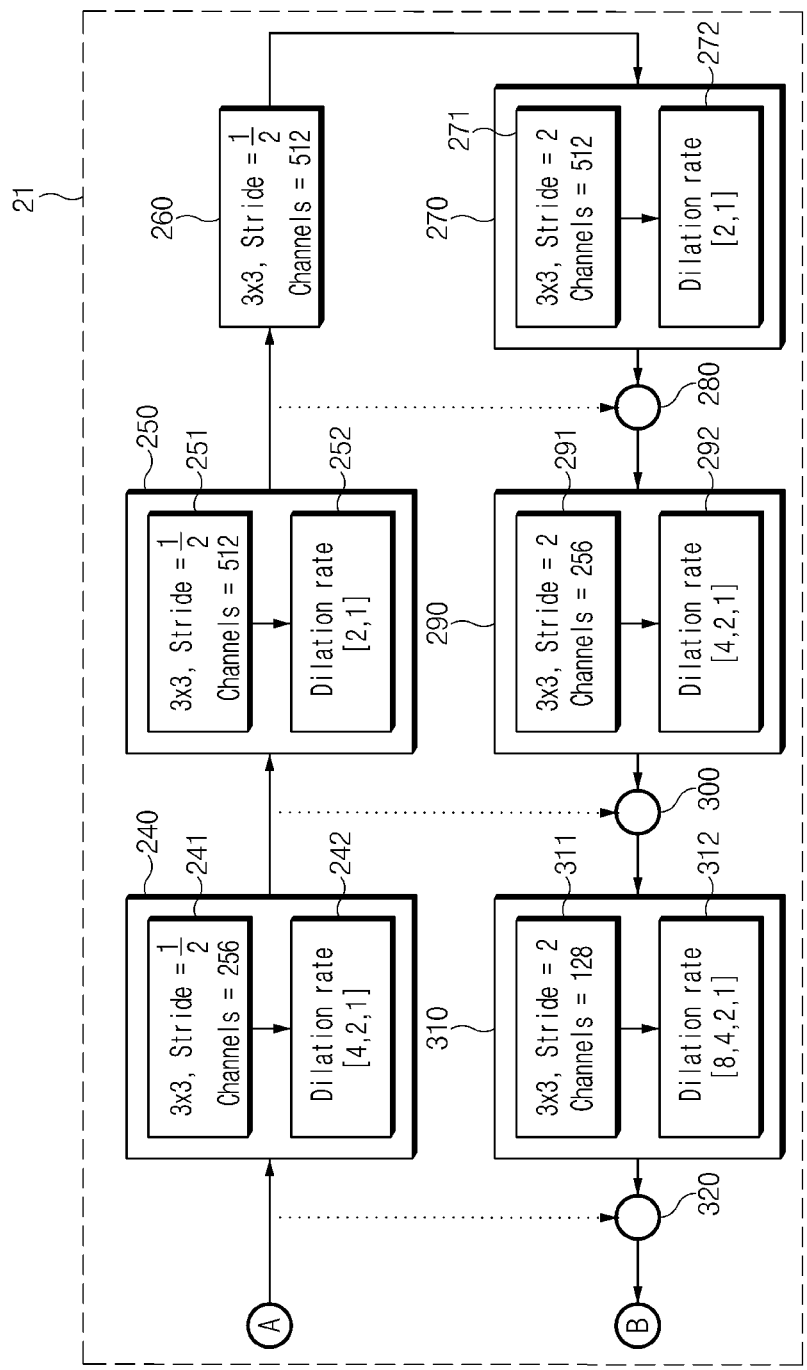

FIGS. 7A and 7B are a block diagram illustrating a detailed configuration of an apparatus for recognizing an object using an image according to an embodiment of the present disclosure.

As shown in FIGS. 7A and 7B, an input device 10 of an apparatus 100 for recognizing an object using an image according to an embodiment of the present disclosure may include a first convolution module 111, a second convolution module 121, and a concatenation module 131.

The first convolution module 111 may generate a feature map, resolution of which is maintained without change (stride=1) and an output channel of which is 16, using a 3×3 filter with respect to an RGB image.

The second convolution module 121 may generate a feature map, resolution of which is maintained without change (stride=1) and an output channel of which is 16, using a 3×3 filter with respect to a gray image. The gray image may be generated from the RGB image.

The concatenation module 131 may concatenate the 16-channel feature map generated by the first convolution module 111 and the 16-channel feature map generated by the second convolution module 121 to generate a 32-channel feature map.

Meanwhile, a depth map generator 21 may include a first processing module 210, a second processing module 220, a third processing module 230, a fourth processing module 240, a fifth processing module 250, a sixth convolution module 260, a seventh processing module 270, a first concatenation module 280, an eighth processing module 290, a second concatenation module 300, a ninth processing module 310, a third concatenation module 320, a tenth processing module 330, a fourth concatenation module 340, an eleventh processing module 350, a fifth concatenation module 360, and a twelfth convolution module 370.

The first processing module 210 may include a first convolution module 211 for generating a feature map, resolution (e.g., 1216×352) of which is maintained without change (stride=1) and an output channel of which is 32, using a 3×3 filter with respect to the 32-channel feature map generated by the concatenation module 131 and a first dilated convolution module 212 for generating a 32-channel feature map by applying a dilation rate of [32, 16, 8, 4, 2, 1] to the 32-channel feature map generated by the first convolution module 211.

The second processing module 220 may include a second convolution module 221 for generating a feature map, resolution of which is reduced to a half (e.g., 608×176) (stride=½) and an output channel of which is 64, using a 3×3 filter with respect to the 32-channel feature map generated by the first dilated convolution module 212 and a second dilated convolution module 222 for generating a 64-channel feature map by applying a dilation rate of [16, 8, 4, 2, 1] to the 64-channel feature map generated by the second convolution module 221.

The third processing module 230 may include a third convolution module 231 for generating a feature map, resolution of which is reduced to a half (e.g., 304×88) (stride=½) and an output channel of which is 128, using a 3×3 filter with respect to the 64-channel feature map generated by the second dilated convolution module 222 and a third dilated convolution module 232 for generating a 128-channel feature map by applying a dilation rate of [8, 4, 2, 1] to the 128-channel feature map generated by the third convolution module 231.

The fourth processing module 240 may include a fourth convolution module 241 for generating a feature map, resolution of which is reduced to a half (e.g., 152×44) (stride=½) and an output channel of which is 256, using a 3×3 filter with respect to the 128-channel feature map generated by the third dilated convolution module 232 and a fourth dilated convolution module 242 for generating a 256-channel feature map by applying a dilation rate of [4, 2, 1] to the 256-channel feature map generated by the fourth convolution module 241.

The fifth processing module 250 may include a fifth convolution module 251 for generating a feature map, resolution of which is reduced to a half (e.g., 76×22) (stride=½) and an output channel of which is 512, using a 3×3 filter with respect to the 256-channel feature map generated by the fourth dilated convolution module 242 and a fifth dilated convolution module 252 for generating a 512-channel feature map by applying a dilation rate of [2, 1] to the 512-channel feature map generated by the fifth convolution module 251.

The sixth convolution module 260 may generate a feature map, resolution of which is reduced to a half (e.g., 38×11) (stride=½) and an output channel of which is 512, using a 3×3 filter with respect to the 512-channel feature map generated by the fifth dilated convolution module 252.

The seventh processing module 270 may include a first pre-convolution module 271 for generating a feature map, resolution of which is increased to two times (e.g., 76×22) (stride=2) and an output channel of which is 512, using a 3×3 filter with respect to the 512-channel feature map generated by the sixth convolution module 260 and a seventh dilated convolution module 272 for generating a 512-channel feature map by applying a dilation rate of [2, 1] to the 512-channel feature map generated by the first pre-convolution module 271.

The first concatenation module 280 may concatenate the 512-channel feature map generated by the seventh dilated convolution module 272 and the 512-channel feature map generated by the fifth dilated convolution module 252.

The eighth processing module 290 may include a second pre-convolution module 291 for generating a feature map, resolution of which is increased to two times (e.g., 152×44) (stride=2) and an output channel of which is 256, using a 3×3 filter with respect to the 512-channel feature map generated by the first concatenation module 280 and an eighth dilated convolution module 292 for generating a 256-channel feature map by applying a dilation rate of [4, 2, 1] to the 256-channel feature map generated by the second pre-convolution module 291.

The second concatenation module 300 may concatenate the 256-channel feature map generated by the eighth dilated convolution module 292 and the 256-channel feature map generated by the fourth dilated convolution module 242.

The ninth processing module 310 may include a third pre-convolution module 311 for generating a feature map, resolution of which is increased to two times (e.g., 304×88) (stride=2) and an output channel of which is 128, using a 3×3 filter with respect to the 256-channel feature map generated by the second concatenation module 300 and a ninth dilated convolution module 312 for generating a 128-channel feature map by applying a dilation rate of [8, 4, 2, 1] to the 128-channel feature map generated by the third pre-convolution module 311.

The third concatenation module 320 may concatenate the 128-channel feature map generated by the ninth dilated convolution module 312 and the 128-channel feature map generated by the third dilated convolution module 232.

The tenth processing module 330 may include a fourth pre-convolution module 331 for generating a feature map, resolution of which is increased to two times (e.g., 608×176) (stride=2) and an output channel of which is 64, using a 3×3 filter with respect to the 128-channel feature map concatenated by the third concatenation module 320 and a tenth dilated convolution module 332 for generating a 64-channel feature map by applying a dilation rate of [16, 8, 4, 2, 1] to the 64-channel feature map generated by the fourth pre-convolution module 331.

The fourth concatenation module 340 may concatenate the 64-channel feature map generated by the tenth dilated convolution module 332 and the 64-channel feature map generated by the second dilated convolution module 222.

The eleventh processing module 350 may include a fifth pre-convolution module 351 for generating a feature map, resolution of which is increased to two times (e.g., 1216×352) (stride=2) and an output channel of which is 32, using a 3×3 filter with respect to the 64-channel feature map concatenated by the fourth concatenation module 340 and an eleventh dilated convolution module 352 for generating a 32-channel feature map by applying a dilation rate of [32, 16, 8, 4, 2, 1] to the 32-channel feature map generated by the fifth pre-convolution module 351.

The fifth concatenation module 360 may concatenate the 32-channel feature map generated by the eleventh dilated convolution module 352 and the 32-channel feature map generated by the first dilated convolution module 212.

The twelfth convolution module 370 may generate a depth map, resolution of which is maintained (stride=1) and an output channel of which is 1, using a 1×1 filter with respect to the 32-channel feature map concatenated by the fifth concatenation module 360.

Figure 8A:
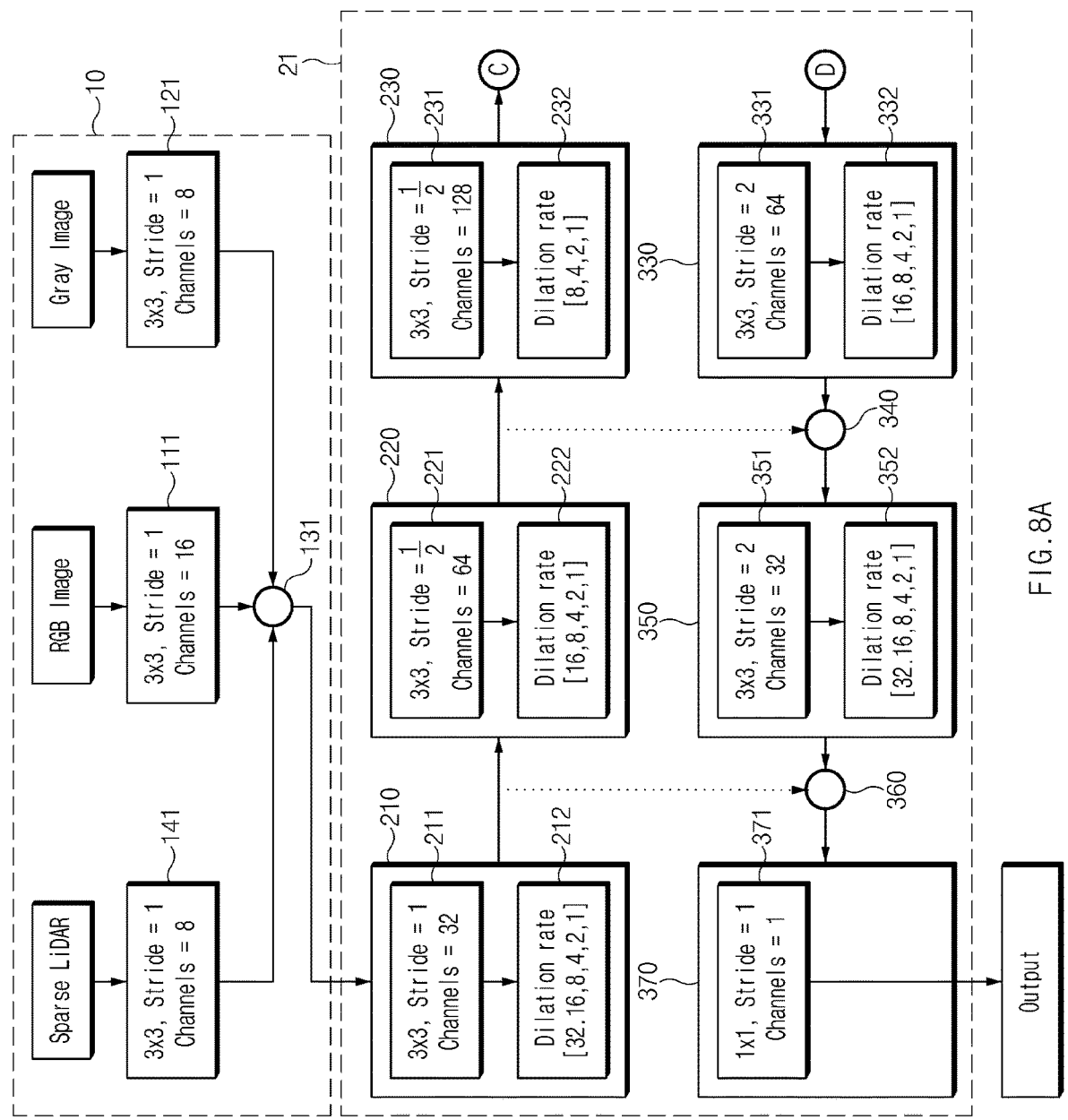
FIGS. 8A and 8B are a block diagram illustrating a detailed configuration of an apparatus for recognizing an object using an image according to another embodiment of the present disclosure.
Figure 8B:
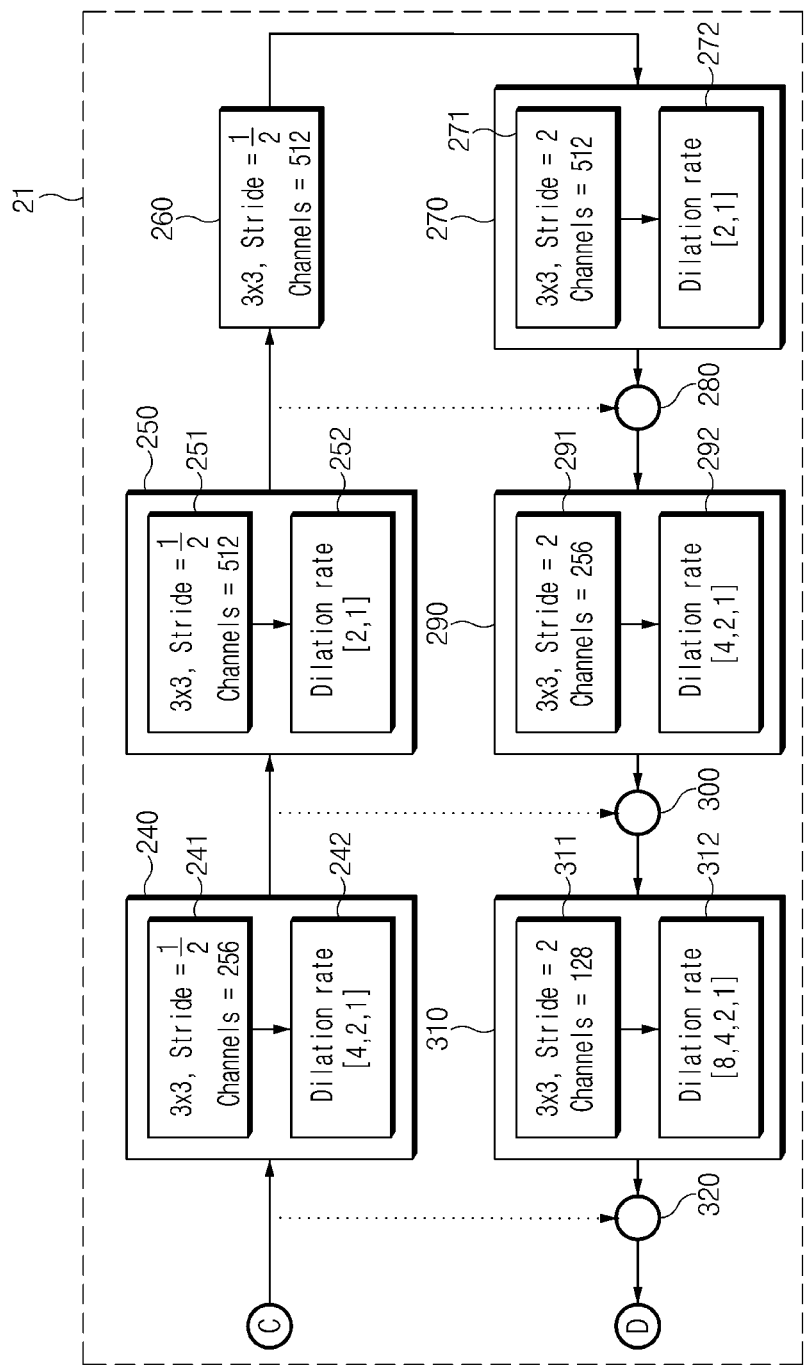

FIGS. 8A and 8B are a block diagram illustrating a detailed configuration of an apparatus for recognizing an object using an image according to another embodiment of the present disclosure.

As shown in FIGS. 8A and 8B, an input device 10 of an apparatus 100 for recognizing an object using an image according to another embodiment of the present disclosure may include a first convolution module 111, a second convolution module 121, a third convolution module 141, and a concatenation module 131.

The first convolution module 111 may generate a feature map, resolution of which is maintained without change (stride=1) and an output channel of which is 16, using a 3×3 filter with respect to an RGB image.

The second convolution module 121 may generate a feature map, resolution of which is maintained without change (stride=1) and an output channel of which is 8, using a 3×3 filter with respect to a gray image. In this case, the gray image may be generated from the RGB image.

The third convolution module 141 may generate a feature map, resolution of which is maintained without change (stride=1) and an output channel of which is 8, using a 3×3 filter with respect to a light detection and ranging (LiDAR) image.

The concatenation module 131 may concatenate the 16-channel feature map generated by the first convolution module 111, the 8-channel feature map generated by the second convolution module 121, and the 8-channel feature map generated by the third convolution module 141 to generate a 32-channel feature map.

Because a detailed configuration of a depth map generator 21 is the same as that shown in FIGS. 7A and 7B, a duplicate description thereof will be omitted.

Another embodiment of the present disclosure is applicable to when a LiDAR image as well as a camera image is obtained.

Figure 9:
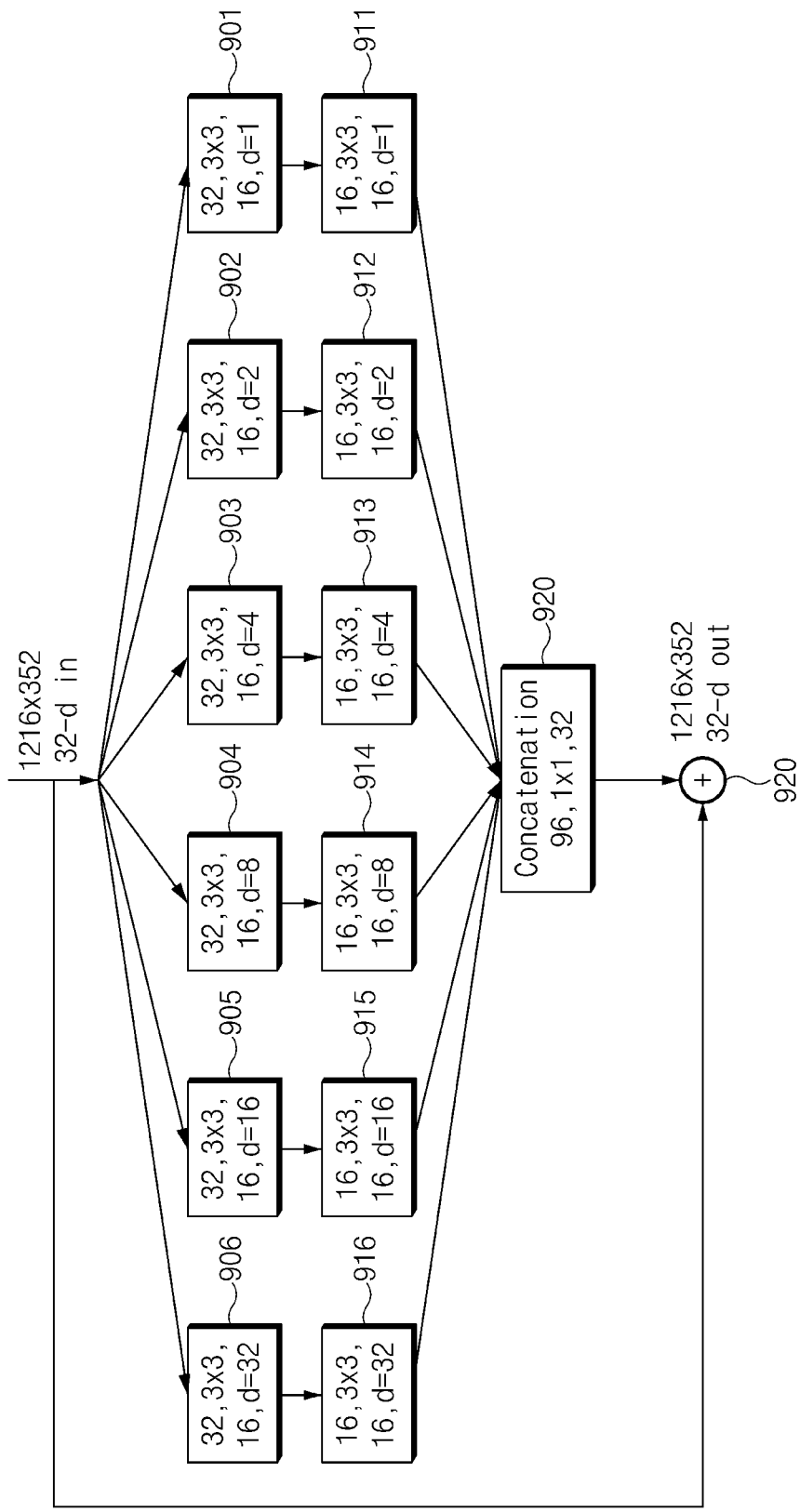
FIG. 9 is a block diagram illustrating a detailed configuration of a dilated convolution module of an apparatus for recognizing an object using an image according to an embodiment of the present disclosure.

FIG. 9 is a block diagram illustrating a detailed configuration of a dilated convolution module 212 or 352 of an apparatus for recognizing an object using an image according to an embodiment of the present disclosure.

As shown in FIG. 9, the dilated convolution module 212 or 352 of the apparatus for recognizing the object using an image according to an embodiment of the present disclosure may include a first module 901 for generating a 16-channel feature map by applying a dilation rate of [1] to a 32-channel feature map, a second module 902 for generating a 16-channel feature map by applying a dilation rate of [2] to the 32-channel feature map, a third module 903 for generating a 16-channel feature map by applying a dilation rate of [4] to the 32-channel feature map, a fourth module 904 for generating a 16-channel feature map by applying a dilation rate of [8] to the 32-channel feature map, a fifth module 905 for generating a 16-channel feature map by applying a dilation rate of [16] to the 32-channel feature map, and a sixth module 906 for generating a 16-channel feature map by applying a dilation rate of [32] to the 32-channel feature map.

Further, the dilated convolution module 212 or 352 may include a seventh module 911 for generating a 16-channel feature map by applying a dilation rate of [1] to the 16-channel feature map, an eighth module 912 for generating a 16-channel feature map by applying a dilation rate of [2] to the 16-channel feature map, a ninth module 913 for generating a 16-channel feature map by applying a dilation rate of [4] to the 16-channel feature map, a tenth module 914 for generating a 16-channel feature map by applying a dilation rate of [8] to the 16-channel feature map, an eleventh module 915 for generating a 16-channel feature map by applying a dilation rate of [16] to the 16-channel feature map, and a twelfth module 916 for generating a 16-channel feature map by applying a dilation rate of [32] to the 16-channel feature map.

Further, the convolution module 212 or 352 may include a concatenation module 920. The concatenation module 920 may concatenate the 16-channel feature map generated by the seventh module 911, the 16-channel feature map generated by the eighth module 912, the 16-channel feature map generated by the ninth module 913, the 16-channel feature map generated by the tenth module 914, the 16-channel feature map generated by the eleventh module 915, and the 16-channel feature map generated by the twelfth module 916 and may generate a 32-channel feature map using a 1×1 filter with respect to the concatenated 96-channel feature map.

Further the convolution module 212 or 352 may include a summer 930 for summing the 32-channel feature map generated by the concatenation module 920 and the initially input 32-channel feature map.

Figure 10:
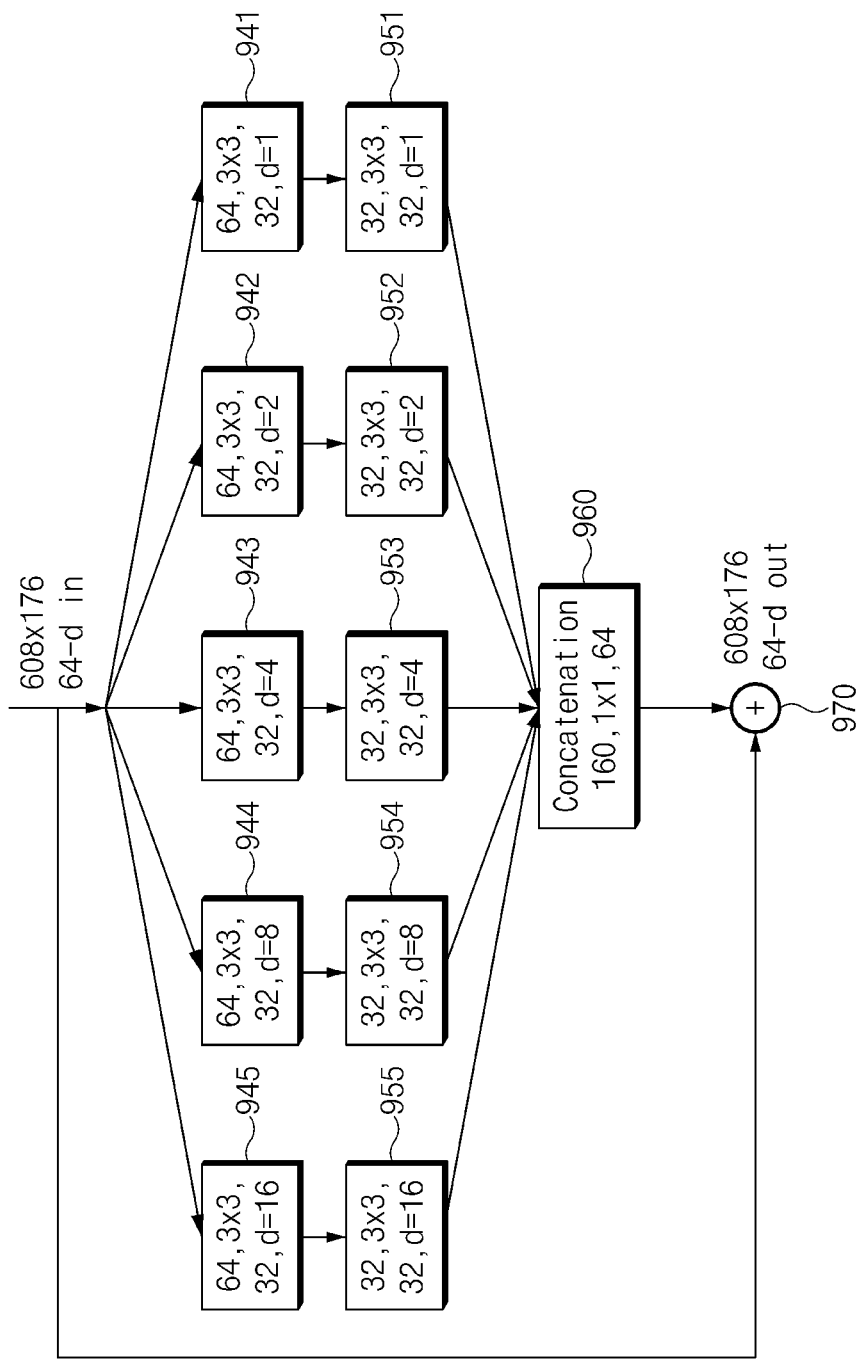
FIG. 10 is a block diagram illustrating a detailed configuration of a dilated convolution module of an apparatus for recognizing an object using an image according to an embodiment of the present disclosure.

FIG. 10 is a block diagram illustrating a detailed configuration of a dilated convolution module 222 or 332 of an apparatus for recognizing an object using an image according to an embodiment of the present disclosure.

As shown in FIG. 10, the dilated convolution module 222 or 332 of the apparatus for recognizing the object using the image according to an embodiment of the present disclosure may include a first module 941 for generating a 32-channel feature map by applying a dilation rate of [1] to a 64-channel feature, a second module 942 for generating a 32-channel feature map by applying a dilation rate of [2] to the 64-channel feature, a third module 943 for generating a 32-channel feature map by applying a dilation rate of [4] to the 64-channel feature, a fourth module 944 for generating a 32-channel feature map by applying a dilation rate of [8] to the 64-channel feature, and a fifth module 945 for generating a 32-channel feature map by applying a dilation rate of [16] to the 64-channel feature.

Further, the dilated convolution module 222 or 332 may include a sixth module 951 for generating a 32-channel feature map by applying a dilation rate of [1] to the 32-channel feature map, a seventh module 952 for generating a 32-channel feature map by applying a dilation rate of [2] to the 32-channel feature map, an eighth module 953 for generating a 32-channel feature map by applying a dilation rate of [4] to the 32-channel feature map, a ninth module 954 for generating a 32-channel feature map by applying a dilation rate of [8] to the 32-channel feature map, and a tenth module 955 for generating a 32-channel feature map by applying a dilation rate of [16] to the 32-channel feature map.

Further, the convolution module 222 or 332 may include a concatenation module 960. The concatenation module 960 may concatenate the 32-channel feature map generated by the sixth module 951, the 32-channel feature map generated by the seventh module 952, the 32-channel feature map generated by the eighth module 953, the 32-channel feature map generated by the ninth module 954, and the 32-channel feature map generated by the tenth module 955 and may generate a 64-channel feature map using a 1×1 filter with respect to the concatenated 160-channel feature map.

Further, the convolution module 222 or 332 may include a summer 970 for summing the 64-channel feature map generated by the concatenation module 960 and the initially input 64-channel feature map.

All the convolution modules may be configured in such a manner.

Figure 11:
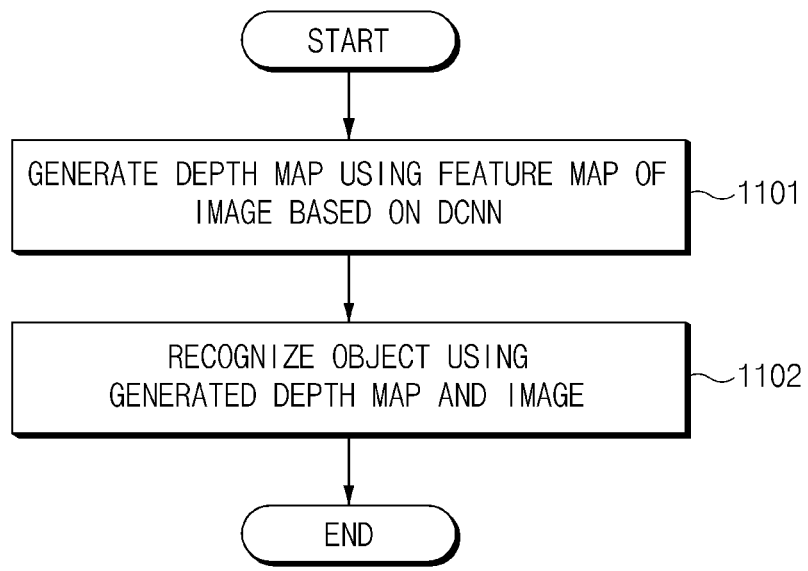
FIG. 11 is a flowchart illustrating a method for recognizing an object using an image according to an embodiment of the present disclosure.

FIG. 11 is a flowchart illustrating a method for recognizing an object using an image according to an embodiment of the present disclosure.

First of all, in operation 1101, a depth map generator 21 of FIG. 1 may generate a depth map using a feature map of an image based on a dilated convolutional neural network (DCNN).

In operation 1102, an object recognition device 22 of FIG. 1 may recognize an object using the depth map generated by the depth map generator 21 and the image.

Figure 12:
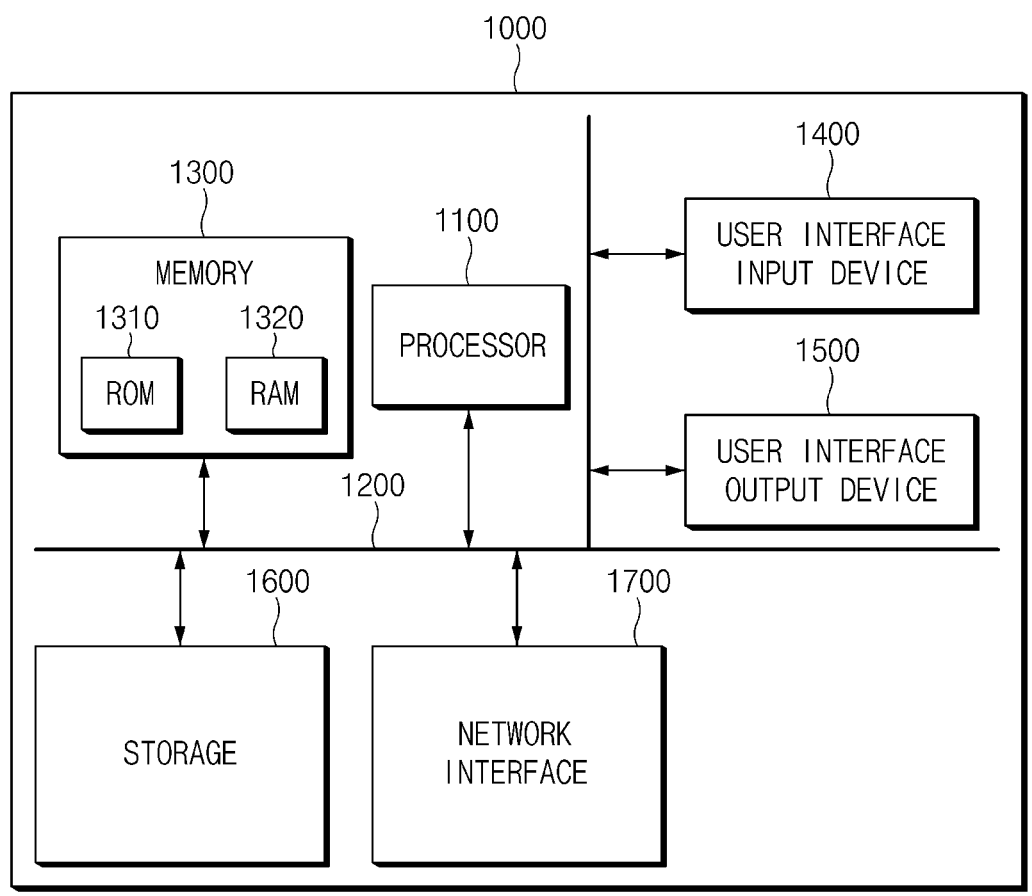
FIG. 12 is a block diagram illustrating a computing system for executing a method for recognizing an object using an image according to an embodiment of the present disclosure.

FIG. 12 is a block diagram illustrating a computing system for executing a method for recognizing an object using an image according to an embodiment of the present disclosure.

Referring to FIG. 12, the method for recognizing the object using the image according to an embodiment of the present disclosure may be implemented by use of the computing system. The computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The apparatus and method for recognizing the object using the image according to an embodiment of the present disclosure may generate a depth map using a single image based on the dilated convolutional neural network (DCNN) and may recognize an object based on the generated depth map and the single image, thus recognizing the object without a LiDAR sensor and increasing an object recognition rate as compared with a technology of recognizing the object using the single image.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for recognizing an object using a RGB (red-green-blue) image), the apparatus comprising:
    a depth map generator configured to generate a depth map using a feature map of the RGB image based on a dilated convolutional neural network (DCNN);
    controller configured to recognize the object using the depth map generated by the depth map generator and the RGB image; and
    an input device configured to input a feature map of the RGB image to the depth map generator and input the RGB image to the controller,
    wherein the input device is configured to:
    generate a first 16-channel feature map using the RGB image;
    generate a second 16-channel feature map using a gray image of the RGB image; and
    generate a 32-channel feature map by concatenating the first 16-channel feature map and the second 16-channel feature map.

2. The apparatus of claim 1, wherein each of the first convolution module and the second convolution module uses a 3×3 filter.

3. An apparatus for recognizing an object using a RGB (red-green-blue) image), the apparatus comprising:
    a depth map generator configured to generate a depth map using a feature map of the RGB image based on a dilated convolutional neural network (DCNN);
    a controller configured to recognize the object using the depth map generated by the depth map generator and the RGB image; and
    an input device configured to input a feature map of the RGB image to the depth map generator and input the RGB image to the controller,
    wherein the input device is configured to:
    generate a 16-channel feature map using the RGB image;
    generate a first 8-channel feature map using a gray image of the RGB image;
    generate a second 8-channel feature map using a light detection and ranging (LiDAR) image; and
    generate a 32-channel feature map by concatenating the 16-channel feature map, the first 8-channel feature map, and the second 8-channel feature map.

4. The apparatus of claim 3, wherein each of the first convolution module, the second convolution module, and the third convolution module uses a 3×3 filter.

5. The apparatus of claim 1, wherein the depth map generator generates the depth map in a manner to gradually reduce resolution of the feature map and return the reduced resolution of the feature map.

6. The apparatus of claim 5, wherein the depth map generator applies a dilation rate corresponding to the resolution of the feature map.

7. The apparatus of claim 5, wherein the depth map generator reduces the resolution of the feature map by half.

8. The apparatus of claim 5, wherein the depth map generator includes a plurality of concatenation modules, each of which concatenates feature maps of the same channel in a process of gradually reducing the resolution of the feature map and returning the reduced resolution of the feature map.

9. A method for recognizing an object using a RGB (red-green-blue) image), the method comprising:
generating, by a depth map generator, a depth map using a feature map of the RGB image based on a dilated convolutional neural network (DCNN);
recognizing, by a controller, the object using the generated depth map and the RGB image;
inputting, by an input device, a feature map of the RGB image to the depth map generator; and
inputting, by the input device, the RGB image to the controller,
wherein the inputting includes:
generating, by the input device, a first 16-channel feature map using the RGB image;
generating, by the input device, a second 16-channel feature map using a gray image of the RGB Image; and
generating, by the input device, a 32 channel feature map by concatenating the first 16-channel feature map and the second 16-channel feature map.

10. The method of claim 9, wherein each of the first convolution module and the second convolution module uses a 3×3 filter.

11. A method for recognizing an object using a RGB (red-green-blue) image), the method composing:
generating, by a depth map generator, a depth map using a feature map of the RGB image based on a dilated convolutional neural network (DCNN);
recognizing, by a controller, the object using the generated depth map and the RGB image;
Inputting, by an input device, a feature map of the RGB image to the depth map generator; and
inputting, by the input device, the RGB image to the controller,
wherein the inputting includes:
generating, by the input device, a 16-channel feature map using the RGB image;
generating, by the input device, a first 8-channel feature map using a gray image of the RGB image;
generating, by the input device, a second 8-channel feature map using a light detection and ranging (LiDAR) image; and
generating, by the input device, a 32-channel feature map by concatenating the 16-channel feature map, the first 8-channel feature, and the second 8-channel feature map.

12. The method of claim 11, wherein each of the first convolution module, the second convolution module, and the third convolution module uses a 3×3 filter.

13. The method of claim 9, wherein the generating of the depth map includes:
generating the depth map in a manner to gradually reduce resolution of the feature map and return the reduced resolution of the feature map.

14. The method of claim 13, wherein the generating of the depth map includes:
applying a dilation rate corresponding to the resolution of the feature map.

15. The method of claim 13, wherein the generating of the depth map includes:
reducing the resolution of the feature map by half.

16. The method of claim 13, wherein the generating of the depth map includes:
concatenating feature maps of the same channel in the process of gradually reducing the resolution of the feature map and returning the reduced resolution of the feature map.

* * * * *